Aug. 20, 1968     J. EHRHARDT ETAL     3,397,459
GEARWHEEL TESTING RECORDER
Filed Jan. 20, 1967.
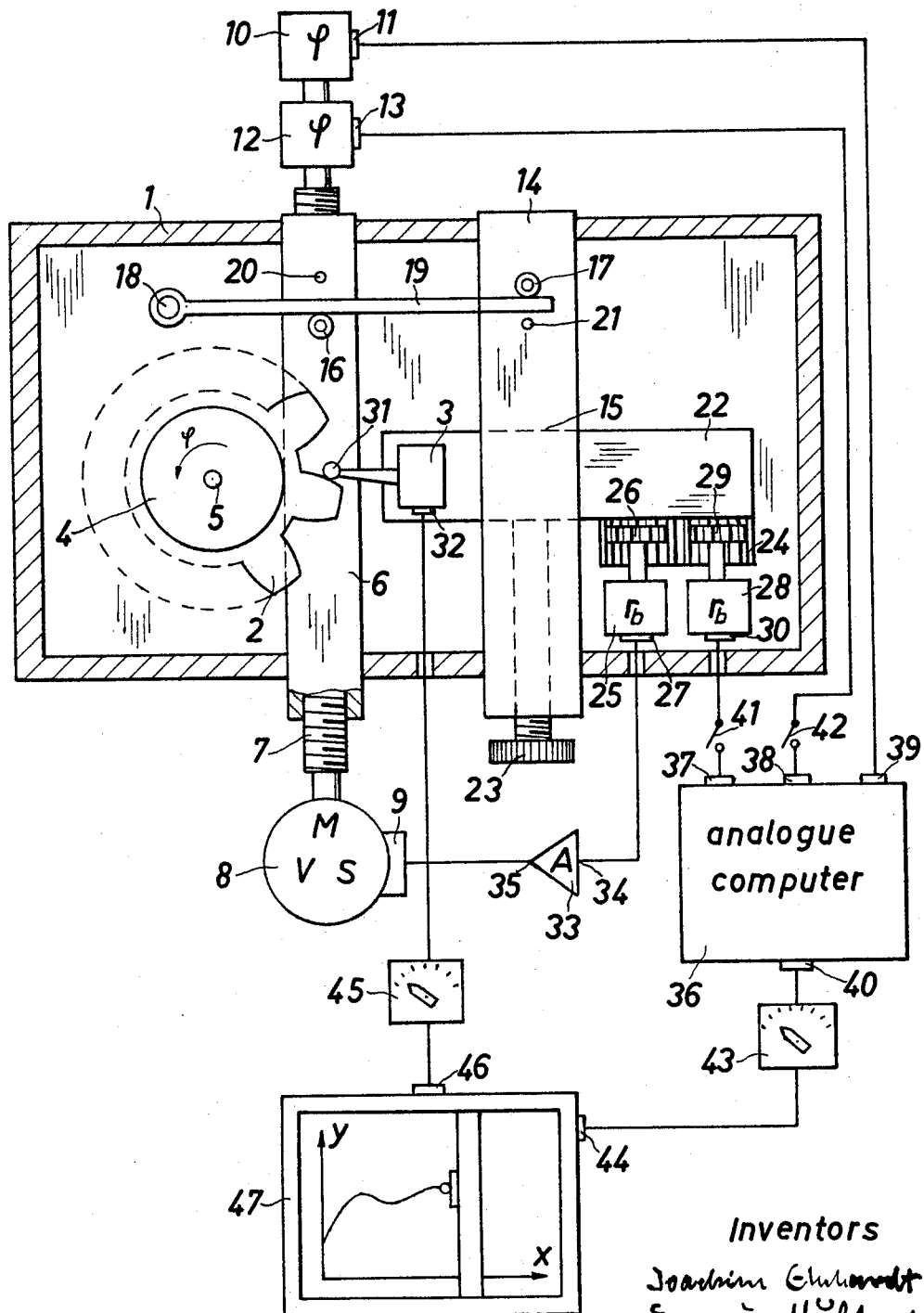
Inventors
Joachim Ehrhardt
Erasmus Hülksch
Bernhard Melief
Franz Söhler 3,397,459
GEARWHEEL TESTING RECORDER
Joachim Ehrhardt, Erasmus Hultzsch, Bernhard Meier, and Franz Söldner, Jena, Germany, assignors to VEB Carl Zeiss Jena, Jena, Germany
Filed Jan. 20, 1967, Ser. No. 611,222
1 Claim. (Cl. 33—179.5)

ABSTRACT OF THE DISCLOSURE

This invention relates to gearwheel testing machines which record deviations of tooth profiles from their nominal involute shape and wherein the gearwheel to be tested is coaxial with and keyed to a cylinder in rolling contact with a rule. The rule by means of a lever imparts to a tangential slide a motion proportional to the rolling-path length of this rule. Displaceable along and lockable to the tangential slide is a radial slide carrying a gauge head which supplies the test data to be recorded.

---

It is an object of the invention to provide a gearwheel testing machine which records deviations of tooth profiles from their nominal involute shape, wherein the scale of the record in the two coordinates can be changed by simple means.

Another object is to provide a gearwheel testing machine of the foregoing kind wherein deviations of tooth profiles can be recorded at option as a function of either the rolling angle, the rolling-path length, or the developed profile length.

A further object is to provide a gearwheel testing machine of the foregoing kind wherein the gauge head senses the profiles of small and big gearwheels at one and the same speed.

A still further object is to provide a gearwheel testing machine of the foregoing kind wherein the gauge head provides a large scale of record if the measuring power is to be weak.

A specific embodiment of the invention will now be described by way of example with reference to the accompanying diagrammatical drawing. In this drawing the electronic connections of the machine are represented only by their electrical measuring and control lines. The current supply lines are omitted for clarity.

A support 1 carries the parts of a mechanism which produces the nominal relative motion in the shape of an involute between a gearwheel 2 to be tested and an electrical gauge head 3.

A rolling cylinder 4 is rotatable about an axle 5 mounted on the support 1. The gearwheel 2 to be tested is clamped to and coaxial with the upper end plane of the cylinder 4 (clamping means not shown). A rule 6 is so mounted on the base 1 as to be displaceable at right angles to the axle 5 and continuously to contact the cylinder 4. The rule 6 has an interior thread, which engages a motion screw 7. The ends of the screw 7 are connected respectively to a motor 8, which has a speed control 9, and to the shafts of a first rotary potentiometer 10 and a second rotary potentiometer 12. The potentiometers 10 and 12 have respectively electrical outputs 11 and 13, which produce tensions proportional to the instantaneous angular position $\varphi$ of the cylinder 4.

A tangential slide 14 mounted on the support 1 for displacement parallel to the rule 6 has a guideway 15 which is at right angles to both the axle 5 and the rule 6. A first control roller 16 and a second control roller 17 are mounted respectively on the rule 6 and the tangential slide 14, these rollers being parallel to the axle 5. A fulcrum 18 is fast with the support 1 and parallel to the axle 5. Two opposite sides of a lever 19 rotatable about the fulcrum 18 contact respectively the first roller 16 and the second roller 17, so that a displacement of the rule 6 along the periphery of the rolling cylinder 4 imparts a proportional displacement to the tangential slide 14.

The rule 6 has first stop 20 near the first roller 16, and the tangential slide 14 has a second stop 21 near the second roller 17. The rule 6 by means of the lever 19 and the stops 20, 21 returns the tangential slide 14 to zero position.

The guideway 15 carries a radial slide 22 which by means of a locking screw 23 can be clamped in the tangential slide 14, so that the radius $r_b$ of the base circle of the tested gearwheel 2 can be adjusted steplessly. Fast with one side of the radial slide 22 is a rack 24 parallel to the guideway 15. The rack 24 engages a pinion 26 of a third rotary potentiometer 25 and a pinion 29 of a fourth rotary potentiometer 28. The electrical output 27 of the potentiometer 25 and the electrical output 30 of the potentiometer 28 produce voltages proportional to the adjusted radius $r_b$ of the base circle.

The radial slide 22 carries the electrical gauge head 3 which by means of a ball 31 senses the profiles of the gearwheel 2 to be tested. The voltage produced at the electrical output 32 of the gauge head 3 is proportional to the deviation of the tooth profile from the nominal involute.

The input 34 of a control amplifier 33 is electrically connected with the output 27 of the third rotary potentiometer 25. The output 35 of the amplifier 33 is connected with the speed control 9 of the motor 8. Accordingly, any change in the adjustment of the radius $r_b$ of the base circle decreases or increases the number of revolutions of the motor 8, so that any tested gearwheel 2 independently of size is sensed at one and the same circumferential speed.

A multiplying analogue computer 36 has a first input 37 and a second input 38. The first input 37 through a switch 41 is electrically connected with the output 30 of the fourth rotary potentiometer 28. The second input 38 through a switch 42 is electrically connected with the output 13 of the second rotary potentiometer 12. A third input 39 of the analogue computer 36 is in direct connection with the output 11 of the first rotary potentiometer 12. A third input 39 of the analogue computer 36 is in direct connection with the output 11 of the first rotary potentiometer 10. At an output 40 of the analogue computer 36, voltage is produced which is proportional to the product of the voltages at the inputs 37, 38 and 39.

The output 40 of the analogue computer 36 is connected by a first stepped potentiometer 43 with the X input 44 of an X–Y compensation recorder 47, and the output 32 of the gauge head 3 is connected by a second stepped potentiometer 45 with the Y input 46 of the X–Y compensation recorder 47.

The magnitude X, as a function of which the deviation Y of a profile from its nominal value is recorded, is selected by means of the switches 41 and 42. If both switches 41 and 42 are open, the magnitude X corresponds to the rolling angle $\varphi$. If the switch 41 is closed, the magnitude X corresponds to the rolling path $r_b \cdot \varphi$. If both switches 41 and 42 are closed, the magnitude X corresponds to the developed profile length $\tfrac{1}{2}\, r_b \cdot \varphi$.

The stepped potentiometers 43 and 45 are used for adjusting the desired magnification scale of the two coordinates.

Instead of the rotary potentiometers 10, 12, 25 and 28 it is possible to use other electrical position-responsive devices, for example, adjusting transformers.

Records of deviations of tooth profiles from the nominal involute shape are obtained in the following manner:
The gearwheel 2 is fixed coaxially on the rolling cylinder 4, and the radial slide 22 carrying the electrical gauge head 3 is adjusted to the radius $r_b$ of the base circle of the wheel 2, whereupon the motor 8 is connected and through the spindle 7 influences the rule 6 and the rolling cylinder 4 carrying the gearwheel 2 to be tested, the lever 19 imparting a proportional displacement to the tangential slide 14 carrying the radial slide 22 and the gauge head 3. The gauge head 3 accordingly describes the nominal shape of the involute, this curve having a definite relation to the tested gearwheel 2. This means however that, while the tooth profile is being sensed, the deviations of the ball 31 of the electrical gauge head 3 from the nominal shape of the involute can in a simple manner be recorded as a Y magnitude in the X–Y compensation recorder 47. When a profile of the gearwheel 2 has been sensed, and the direction of rotation of the motor 8 reversed, the rule 6 by means of the lever 19 and the stops 20 and 21 returns the tangential slide 14 to zero position.

We claim:

1. A gearwheel testing machine for recording deviations of tooth profiles from their nominal involute shape, comprising a support, a rolling cylinder having the gearwheel to be tested coaxially keyed to it and being rotatable about an axle fast with said support, a rule mounted on said support and displaceable at right angles to said axle, said rule being in rolling contact with said cylinder and containing an interior thread engaging a motion screw, a motor operating said screw and having a speed control, a first rotary potentiometer and a second rotary potentiometer, each of said potentiometer having an output and a shaft rigidly connected with said screw, a tangential slide mounted in said support and displaceable parallel to said rule and having a radial guideway at right angles to said axle and to said rule, a first control roller fast with said rule and parallel to said axle, a second control roller fast with said tangential slide and parallel to said axle, a lever rotatable about a fulcrum fast with said support and parallel to said axle, two opposite sides of said lever contacting respectively said first and said second control roller, a radial slide displaceable in said guideway and having a rack parallel to said guideway, means for clamping said radial slide to said tangential slide, a third rotary potentiometer having an output and a pinion engaging said rack, a fourth rotary potentiometer having an output and a pinion engaging said rack, an electrical gauge head fast with said radial slide, said gauge head having an output and a sensing ball contacting a profile of the gearwheel to be tested, a control amplifier having an input electrically connected with the output of said third rotary potentiometer and having an output electrically connected with said speed control, a multiplying analogue computer having three inputs, the first and the second of said inputs of said computer being by means of switches electrically connected with the outputs of respectively said second and said fourth rotary potentiometer, the third of said inputs of said computer being in direct electrical contact with the output of said first rotary potentiometer, and an X–Y compensation recorder having an X input and a Y input, said X input being through a first stepped potentiometer electrically connected with the output of said analogue computer, and said Y input being through a second stepped potentiometer electrically connected with the output of said gauge head.

References Cited
UNITED STATES PATENTS

| | | | |
|---|---|---|---|
| 2,305,264 | 12/1942 | Leonard | 33—179.5 X |
| 2,778,119 | 1/1957 | Jumisco | 33—179.5 |

RICHARD B. WILKINSON, *Primary Examiner.*

J. W. HARTARY, *Assistant Examiner.*